(12) United States Patent
Feist et al.

(10) Patent No.: US 6,508,961 B1
(45) Date of Patent: *Jan. 21, 2003

(54) STRUCTURE AND METHOD FOR MOLDING OPTICAL DISKS

(75) Inventors: Thomas Paul Feist, Clifton Park, NY (US); Thomas Bert Gorczyca, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 09/633,141

(22) Filed: Aug. 4, 2000

Related U.S. Application Data

(63) Continuation-in-part of application No. 09/071,624, filed on May 1, 1998, now Pat. No. 6,146,558.

(51) Int. Cl.⁷ .................................................. B29D 11/00
(52) U.S. Cl. ..................... 264/1.33; 249/114.1; 249/134; 249/135; 264/320.16; 425/810; 427/135
(58) Field of Search ................................ 264/1.33, 106, 264/107, 329.16; 249/114, 114.1, 116, 135, 134; 425/547, 810; 427/133, 135

(56) References Cited

U.S. PATENT DOCUMENTS

| | | |
|---|---|---|
| 4,225,109 A | 9/1980 | Yotsutsuji et al. |
| 4,783,041 A | 11/1988 | Sakaida et al. |
| 4,879,082 A | 11/1989 | Kudo et al. |
| 5,041,247 A | 8/1991 | Kim |
| 5,124,192 A | 6/1992 | Kim et al. |
| 5,176,839 A | 1/1993 | Kim |
| 5,288,519 A | 2/1994 | Baumgartner et al. |
| 5,290,597 A | 3/1994 | Baumgartner et al. |
| 5,302,467 A | 4/1994 | Baumgartner et al. |
| 5,324,473 A | 6/1994 | Baresich |
| 5,388,803 A | 2/1995 | Baumgartner et al. |
| 5,458,818 A | 10/1995 | Kim et al. |
| 5,897,814 A | * 4/1999 | Niemeyer et al. ......... 264/1.33 |
| 6,146,558 A | * 11/2000 | Feist et al. ................. 264/1.33 |

FOREIGN PATENT DOCUMENTS

| | | |
|---|---|---|
| EP | 0489335 A | 11/1991 |
| EP | 0796713 A | 2/1997 |
| JP | 87-5824 | 8/1987 |
| JP | 87-180541 | 8/1987 |
| JP | 88-71325 | 3/1988 |

OTHER PUBLICATIONS

U.S. Patent Application "Method for Injection Molding of Optical Discs" by Matthew F. Niemeyer, et al, Ser. No.: 08/874,235, Atty Docket No. 8CT–5646, filed Jun. 13, 1997.

(List continued on next page.)

*Primary Examiner*—Mathieu D. Vargot
(74) *Attorney, Agent, or Firm*—Ann M. Agosti; Patrick K. Patnode

(57) ABSTRACT

A method for molding an optical disk includes applying a thermally insulative mold insert onto a thermally conductive mold form by coating the mold insert on the mold form. The mold insert has a coefficient of thermal expansion compatible with the coefficient of thermal expansion of the mold form and includes an adhesion promoting material. The method further includes positioning the coated mold form in a thermally conductive mold apparatus with the mold insert positioned between the mold form and the mold apparatus; injecting a molten thermoplastic material into the mold apparatus; retaining the molten thermoplastic material in the mold apparatus for a time sufficient for the molten thermoplastic material to cool below its glass transition temperature to form the optical disk; and ejecting the optical disk from the mold apparatus.

9 Claims, 2 Drawing Sheets

OTHER PUBLICATIONS

DuPont Technical Bulletin "Pyralin Polyimide Coatings for Electronics VM–651 and VM–652 Adhesion Promoters", H–73153, effective Jun., 1997, one page.

GE Plastics Article "Better Surface Replication for DVD and Recordable Discs Through Managed Heat Transfer" by Matthew F. Niemeyer, et al, pp. 1–10+7 sheets of figures, presented at ITA–MOMS conference 10/96, San Francisco, CA.

GE Plastics Article "The Application of Managed Heat Transfer to the Production of Higher Quality Optical Discs" by Mathew F. Niemeyer, et al, 9 pages+7 pages of figures presented at Replitech Conference 6/96 California.

* cited by examiner

STRUCTURE AND METHOD FOR MOLDING OPTICAL DISKS

CROSS REFERENCE TO RELATED APPLICATION

This application is a continuation-in-part of application Ser. No. 09/071,624, filed May 1, 1998, now U.S. Pat. No. 6,146,558, which is herein incorporated by reference.

BACKGROUND OF THE INVENTION

The present invention relates to a structure and process for injection molding optical and compact disks.

Injection molding involves injecting molten thermoplastic resin into a mold apparatus. Molds for injection molding of thermoplastic resin are usually made from metal materials such as iron, steel, stainless steel, aluminum, or brass because these materials have high thermal conductivity and thus permit the melt of thermoplastic resin to cool rapidly and shorten the molding cycle time. A drawback to rapid cooling in these molds is that the injected resin freezes instantaneously at the mold surface, resulting in a thin solid layer. Quick quenching of the melt at the mold surface creates a rough surface (instead of a high quality optical surface) which can impact disc performance. The quick solidification of the melt combined with variable radial flowability of the materials makes the uniform melt flow and uniform surface replication required for an optical disk difficult to achieve. Non-uniform flow and surface imperfections can result in areas on an optical disk with high bit errors.

In the injection molding of compact discs, for audio, video, or computer data storage and retrieval applications, heat transfer through the mold thus has a strong effect on molding time and disc attributes such as birefringence, flatness, and accuracy of feature replication. For a process to be economical, a careful balance must be maintained between low cycle times and the process parameters needed to meet the quality requirements.

A method for affecting heat transfer and improving the cycle time during injection molding by incorporating insulation into the mold has been described in commonly assigned Kim et al., U.S. Pat. No. 5,458,818. In Kim et al., a multilayer mold is used in which a metal core has an insulating layer bonded thereto for slowing the initial cooling of the resin during the molding operation. The insulating layer comprises material having both low thermal diffusivity and conductivity, thus slowing the cooling of the molded resin, and good resistance to high temperature degradation, permitting use in a mold maintained at high temperatures. One or more skin layers of hard material, typically metal, can be bonded to the insulating layer.

Another method for affecting heat transfer is described in Nakamura et al., Japanese Unexamined Patent Application Disclosure Bulletin No. 88-71325. In Nakamura et al., a layer of synthetic resin is formed on a stamper by coating or lamination before the stamper is placed on the core molding surface of the metal mold.

The use of an insulating layer is desirable so as to cause a minimal change in the size and shape of the molding tool and equipment. For compact discs, stringent requirements of optical clarity, surface morphology, and replication of surface features of sub-micron dimensions obviate the use of common insulating materials, which do not provide a smooth enough surface, are not stable for long periods at the mold temperature, or cannot withstand the repeated application of high pressure during the molding process.

For a sheet or film to be useful for managing heat transfer for a mold it must have a very smooth surface (<0.1 $\mu$m surface roughness) over a large area so that it will not introduce feature replication errors or surface imperfections into the manufactured disk. It is also preferred that the surface be compliant to attenuate minor imperfections in the molding tool while maintaining mechanical and dimensional integrity during the molding process.

SUMMARY OF THE INVENTION

It is therefore seen to be desirable to provide a structure and method for molding optical disks having improved surface replication and improved molding characteristics.

Briefly, in accordance with one embodiment of the present invention, a method for molding an optical disk comprises: applying a thermally insulative mold insert onto a thermally conductive mold form by coating the mold insert on the mold form, the mold insert having a coefficient of thermal expansion compatible with the coefficient of thermal expansion of the mold form and comprising an adhesion promoting material; positioning the coated mold form in a thermally conductive mold apparatus with the mold insert positioned between the mold form and the mold apparatus; injecting a molten thermoplastic material into the mold apparatus; retaining the molten thermoplastic material in the mold apparatus for a time sufficient for the molten thermoplastic material to cool below its glass transition temperature to form the optical disk; and ejecting the optical disk from the mold apparatus.

According to another embodiment of the present invention, a mold insert for being coated on a mold form and positioned in a mold apparatus between the mold apparatus and the mold form has a coefficient of thermal expansion compatible with the coefficient of thermal expansion of the mold form and comprises an adhesion promoting material.

In a related embodiment, an optical disk mold apparatus comprises: at least one thermally conductive mold form at least one thermally insulative mold insert coated onto the thermally conductive mold form, the mold insert having a coefficient of thermal expansion compatible with the coefficient of thermal expansion of the mold form and comprising an adhesion promoting material; and a thermally conductive mold apparatus, with the at least one coated mold insert positioned between the thermally conductive mold form and a portion of the thermally conductive mold apparatus.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF A PREFERRED EMBODIMENT OF THE INVENTION

A thin, smooth polymer sheet comprising a homogeneous film or composite layered structure is used to control heat flow during injection molding of a compact disc and to thereby provide improved disc quality and/or reduced cycle time. The sheet is positioned behind the information side and/or mirror side of the mold, thereby managing heat transfer through the mold walls and allowing improved replication of mold features and/or reduced mold temperature. The process steps are performed in an environment that is as clean as feasible.

Figure 1:
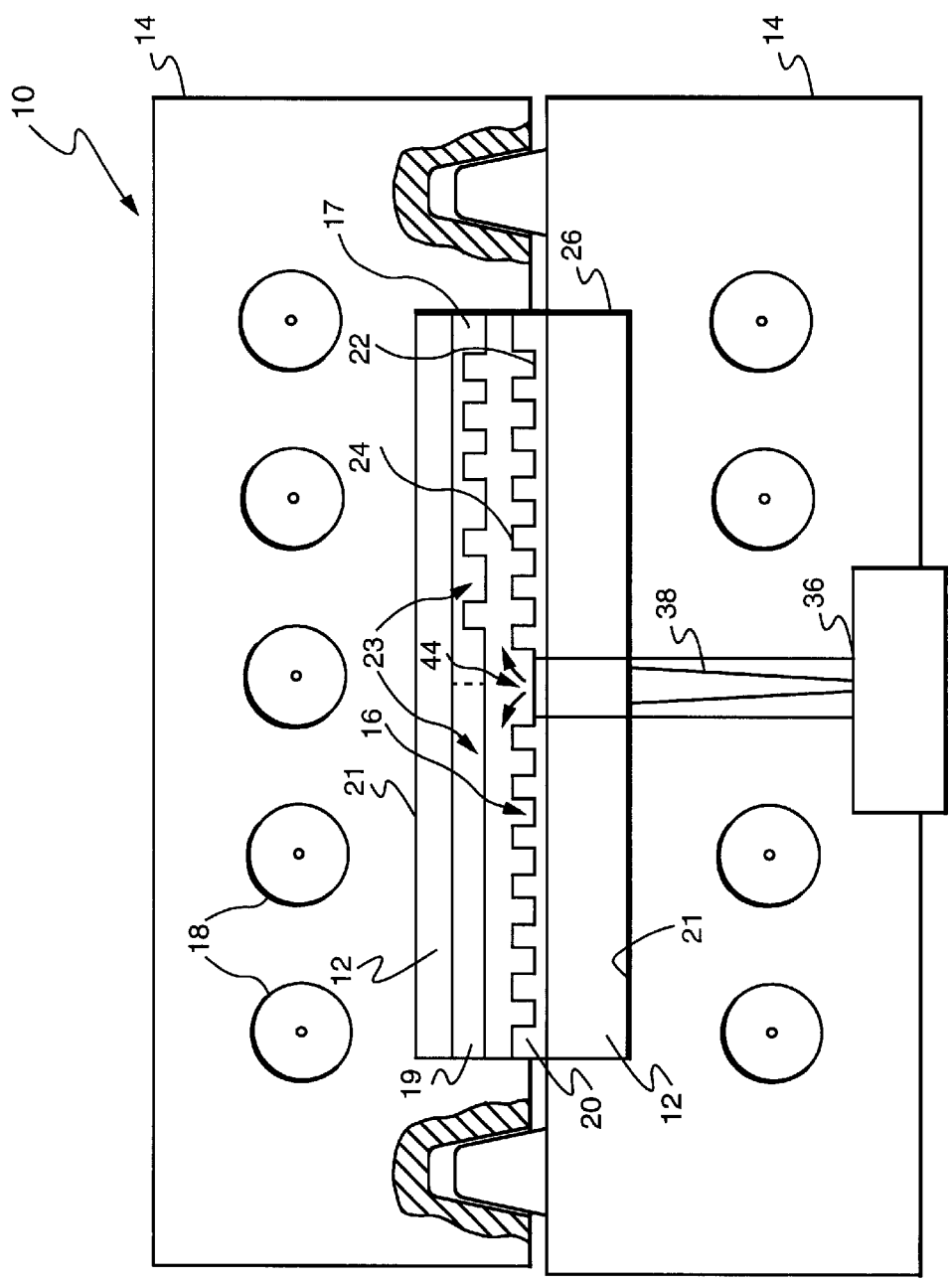
FIG. 1 is a side view of an injection molding embodiment.

FIG. 1 is a sectional side view of an injection mold 10 including a thermally insulative mold insert 12 and a pair of mold halves 14 of high thermally conductive material forming a mold cavity 16. Thermally insulative is meant to include materials having coefficients of thermal conductivity less than or equal to about 50 W/m K. Thermally conductive is meant to include materials having coefficients of thermal conductivity greater than or equal to about 100 W/m K.

Cooling lines 18, such as copper pipes, are provided in each half 14 for receiving a cooling fluid to reduce cycle time. At least one compact disk or optical disk stamper mold form 20 is positioned in the mold cavity 16 as shown and secured therein in a known manner. The stamper 20 has a grooved or pitted surface 22 which carries information.

If desired, a second mold form 23 can additionally be positioned in mold cavity 16. For purposes of example, a smooth surface mold form is represented by portion 19 and a second stamper mold form having a grooved or pitted surface for carrying information is represented by portion 17. Thus a stamper mold form 20 can be the only mold form, can be used with a smooth mold form, or can be used with a second stamper mold form. The stamper and smooth mold forms are collectively referred to hereinafter as mold forms. Typically, mold forms comprise electroplated nickel and mold halves comprise steel.

Each mold half 14 can have a surface 21 for supporting the mold insert 12. The insert 12 may be in the form of a single thin insulating layer or multilayer insulated structure which can be fabricated from low thermally conductive materials such as high temperature thermoplastic materials, thermoset materials, plastic composites, porous metals, ceramics and low-conductivity metal alloys. Preferably, the insert may be a flexible film such as a polyimide film from about 10 micrometers to about 500 micrometers thick. The insert may alternatively comprise a film of polyamideimide, polyethersulfone or polyetherketone, or any other material with adequately low thermal conductivity.

Hot thermoplastic resin can be injected into the mold cavity via sprue bushing 36 and sprue 38. Heat from the resin is absorbed through the stamper 20 (and smooth mold form 19 or second stamper 17, if applicable) with the heat transfer being regulated by the at least one mold insert 12 which prevents quick cooling of the resin 44 and causes the stamper to reheat. This results in a hot plastic surface at the interface between the stamper and resin 44 for a short time period.

In practice, it is most useful for mold inserts to be positioned on each side of the mold as shown in FIG. 1. The present invention is also useful if a mold insert is used with one or both mold halves.

Figure 2:
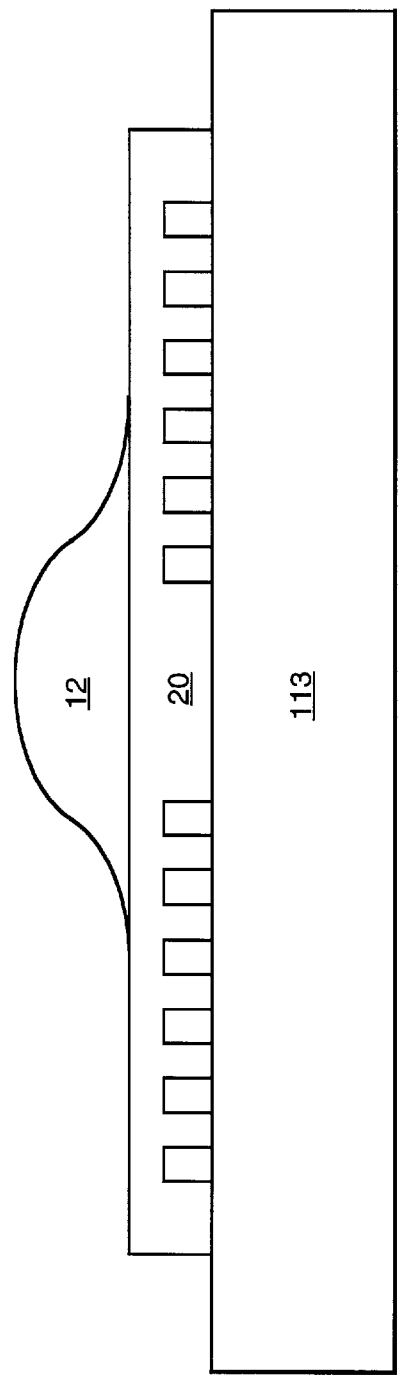
FIG. 2 is a side view of liquid insulative mold insert material on a stamper.

FIG. 2 is a side view of liquid insulative mold insert material 12 on a stamper illustrating an embodiment of the present invention wherein the insert is applied directly to the stamper. Although FIGS. 2 and 3 relate to application of the insert on a stamper, the process works in the same manner for applying the insert on a smooth surface mold form 19 (shown in FIG. 1). The mold form may comprise a conventional metal mold form or a mold form which has been modified during its manufacture.

In this embodiment of the present invention, the insert material is selected to have coefficient of thermal expansion compatible with the coefficient of thermal expansion of the mold form. It is expected that insert material coefficients of thermal expansion should be equal to or less than a multiple of three times the coefficient of thermal expansion of the mold form. In a preferred embodiment, the insert material coefficient of thermal expansion is equal to or less than a multiple of two times the coefficient of thermal expansion of the mold form. In one embodiment, for example, the insert material comprises ULTRADEL™ 5106 polyimide (ULTRADEL is a trademark of Amoco Chemicals of Naperville, Ill.) having a coefficient of thermal expansion in the plane of the film of about 24 ppm/° C. (parts per million per degrees centigrade), and the mold form comprises nickel having a coefficient of thermal expansion of about 13 ppm/° C. In addition to polyimides, other appropriate mold insert materials include polyetherimide, polyamideimide, polyethersulfone, polyetherketone, or thermoplastic, thermoset, plastic composite, or other materials with adequately low thermal conductivity.

To enhance adhesion of the mold insert to the mold form, the insert material further comprises an adhesion promoter added separately onto the mold form prior to application of the mold insert material or dispersed directly into the mold insert material (dispersed therethrough). Good adhesion of the mold insert to the mold form is important for achieving a smooth surface of the mold insert on the mold form. If the mold insert were to delaminate or bubble on the mold form, optical disks molded by the mold form would have low quality. Useful adhesion promoters include, for example, amino-alkyl silanes that show good affinity for the mold insert and mold form material. Typically, the silane portion of the molecule will show good adhesion to the mold insert and the organic portion chosen so as to optimize adhesion to the mold form material. In one embodiment the adhesion promoter comprises an organosilane such as, for example, α-amino propyltriethoxysilane (the active ingredient in DuPont Co.'s organosilanes marketed under the order numbers VM-651 and VM-652). Other adhesion promoters include, but are not limited to Hexamethyldisilazane (commonly referred to as HMDZ, available from United Chemical Technologies, Bristol, Pa.) and Chloromethylphenyl-timethoxysilane (available from Gelest, Inc., Tullytown, Pa.).

The adhesion promoters may be applied to the mold form using a variety of methods which include spin coating a dilute solution of the adhesion promoter onto the mold form to leave a very thin coating. For example, a 0.1% solution of VM651 in water (1 ml of VM651 is added into 1000 ml of water) is prepared and spin coated onto a mold form at 2000 rpm to provide an adhesion promoted surface. Alternatively, HMDZ may be applied using vapor phase deposition. In this case the mold form is heated to approximately 110° C. under vacuum, HMDZ is allowed to enter the chamber for 5 minutes which coats the surface with adhesion promoter. The chamber is them evacuated and the mold form removed.

As another alternative, good adhesion between the mold form and the mold insert may be obtained by adding adhesion promoting material constituents directly into the mold insert material. Coating solutions such as HD Microsystems P12730 series of coating materials have been formulated with up to 5% adhesion promoter in the solution containing solvent (N-methyl-2-pyrrolidone) and an amic-ester polymer or oligomeric precursor. In the present invention, the adhesion promoter has a great enough concentration in the insert material (coating solution) to allow a sufficient amount of adhesion promoter to be present at the mold form/mold insert interface. The insert material can be applied to the mold form (substrate) without separate application of an adhesion promoter, and good adhesion of the final insulating mold insert is obtained.

As will be recognized by those skilled in the art, if a polymer in the mold insert material has appropriate functionality to obtain good adhesion to the mold form (substrate), then a good coating can be achieved without the use of any additional adhesion promoter. An example would be the use of a siloxane-polyimide copolymer, where the Silicon functionality on the polymer backbone (chain) promotes the formation of an adhesive bond between the coating and substrate. Of course, similar benefits could be realized if adhesive functionality were added as "pendant" groups (or side chains) on the polymer backbone.

In the embodiment of FIG. 2, insert material 12 in liquid form is positioned in the middle of the back surface of the stamper which itself is positioned on rotating tool 113. The volume of the insulator material will depend on the desired thickness and the area to be coated. In one embodiment, the volume ranges from about three milliliters to about five milliliters.

Figure 3:
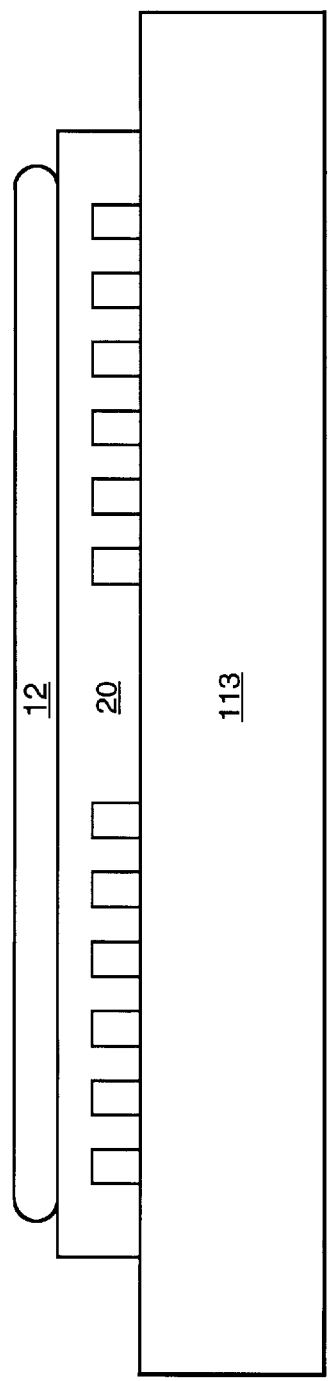
FIG. 3 is a view similar to that of FIG. 2 with the insert material spread over the stamper.

FIG. 3 is a view similar to that of FIG. 2 with the insert material spread over the stamper. The stamper is spun (rotated) on rotating tool 113 to distribute the insert material over the surface of the stamper to a desired thickness. In one embodiment, the stamper is spun in the range of about 1000 RPM (rotations per minute) to about 3000 RPM for a time ranging from about 20 seconds to about 30 seconds, for example. Other coating techniques include dip coating, meniscus coating, and spray coating, for example.

The desired thickness of the insert will vary according to the embodiment in which the insert will be used, but generally the thickness will be in the range of about 5 micrometers to about 250 micrometers. In embodiments in which the insert will only be provided on one side of the mold, a thinner layer in the range of about 5 micrometers to about 25 micrometers is more appropriate for even heat transfer. In embodiments where inserts are present on both sides of the mold, thicker layers can be used. These embodiments are desirable for improving disk quality because thicker insulation permits the molding process to be run at lower melt and mold temperatures, but many molding machines are not adapted to include an insert on the smooth side of the mold.

After the insert material is applied and coated, the stamper and insert material are cured. Curing can be performed in a two step process, for example, by baking at about 100° C. for a range of time from about fifteen minutes to about three hours followed by baking in a nitrogen atmosphere at about 200–300° C. for a range of between one hour to three hours.

In some embodiments, several layers of insert material may be applied sequentially in order to build up an insert of the appropriate thickness and/or composite structure. After curing, the stamper and insert can be punched and packaged for shipment and/or molding.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for molding an optical disk comprising:
   applying a thermally insulative mold insert onto a thermally conductive mold form by coating the mold insert on the mold form, the mold insert having a coefficient of thermal expansion compatible with the coefficient of thermal expansion of the mold form and comprising an adhesion promoting material;
   positioning the coated mold form in a thermally conductive mold apparatus with the mold insert positioned between the mold form and the mold apparatus;
   injecting a molten thermoplastic material into the mold apparatus;
   retaining the molten thermoplastic material in the mold apparatus for a time sufficient for the molten thermoplastic material to cool below its glass transition temperature to form the optical disk; and
   ejecting the optical disk from the mold apparatus.

2. The method of claim 1 wherein the thermally insulative mold insert comprises at least two layers of thermally insulative mold insert material and wherein the step of coating includes coating a first layer of thermally insulative mold insert material on the mold form, at least partially curing the first layer of thermally insulative mold insert material, coating a second layer of thermally insulative mold insert material, and curing the second layer of insulative mold insert material.

3. The method of claim 1 wherein the mold insert comprises a polyimide and an organosilane.

4. The method of claim 1 wherein applying the thermally insulative mold insert comprises spin coating the thermally insulative mold insert.

5. A method for molding an optical disk comprising:
   applying a thermally insulative mold insert onto a thermally conductive mold form by spin coating the mold insert on the mold form, the mold insert having a coefficient of thermal expansion compatible with the coefficient of thermal expansion of the mold form and comprising a polyimide and an organosilane;

positioning the coated mold form in a thermally conductive mold apparatus with the mold insert positioned between the mold form and the mold apparatus;

injecting a molten thermoplastic material into the mold apparatus;

retaining the molten thermoplastic material in the mold apparatus for a time sufficient for the molten thermoplastic material to cool below its glass transition temperature to form the optical disk; and ejecting the optical disk from the mold apparatus.

6. A thermally conductive mold form and a thermally insulative mold insert for being positioned in a mold apparatus for molding molten thermoplastic material into finished optical disks, the mold form and the mold insert comprising a thermally insulative mold insert coated onto a thermally conductive mold form, the mold insert having a coefficient of thermal expansion compatible with the coefficient of thermal expansion of the mold form and comprising an adhesion promoting material.

7. The mold form and the mold insert of claim 6 wherein the mold insert comprises a polyimide and an organosilane.

8. An optical disk mold apparatus comprising:

at least one thermally conductive mold form at least one thermally insulative mold insert coated onto the thermally conductive mold form, the mold insert having a coefficient of thermal expansion compatible with the coefficient of thermal expansion of the mold form and comprising an adhesion promoting material; and a thermally conductive mold apparatus, the at least one coated mold insert positioned between the thermally conductive mold form and a portion of the thermally conductive mold apparatus.

9. The optical disk mold apparatus of claim 8 wherein the mold insert comprises a polyimide and an organosilane.

* * * * *